(12) United States Patent  (10) Patent No.: US 7,762,156 B2
Chang et al.  (45) Date of Patent: Jul. 27, 2010

(54) CABLE-DRIVEN WRIST MECHANISM FOR ROBOT ARMS

(75) Inventors: Pyung Hun Chang, Daejeon (KR); Seong Tae Kim, Daejeon (KR); Hyung Soon Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 444 days.

(21) Appl. No.: 11/728,040

(22) Filed: Mar. 22, 2007

(65) Prior Publication Data

US 2008/0223159 A1  Sep. 18, 2008

Related U.S. Application Data

(63) Continuation-in-part of application No. 10/768,279, filed on Jan. 29, 2004, now abandoned.

(30) Foreign Application Priority Data

Jul. 8, 2003  (KR) ................ 2003-46140

(51) Int. Cl.
  *B25J 17/00* (2006.01)
  *B25J 17/02* (2006.01)
(52) U.S. Cl. ................ 74/490.06; 74/490.04
(58) Field of Classification Search ............. 74/490.01, 74/490.02, 490.03, 490.04, 490.06; 901/21, 901/29
See application file for complete search history.

(56) References Cited

U.S. PATENT DOCUMENTS

| 5,046,375 A | 9/1991 | Salisbury, Jr. et al. |
| 6,122,981 A * | 9/2000 | Matteo ............... 74/89.22 |
| 6,263,755 B1 * | 7/2001 | Perlin ............... 74/490.01 |
| 2008/0229862 A1 * | 9/2008 | Nakamoto ............ 74/490.04 |

FOREIGN PATENT DOCUMENTS

| KR | 1996-016644 | 6/1996 |
| KR | 1997-028012 | 7/1997 |
| KR | 1998-701448 | 5/1998 |
| KR | 1998-054687 | 9/1998 |
| KR | 1999-0070427 | 9/1999 |

* cited by examiner

*Primary Examiner*—Thomas R Hannon
*Assistant Examiner*—Justin Krause
(74) *Attorney, Agent, or Firm*—Kevin D. Jablonski; Graybeal Jackson LLP

(57) ABSTRACT

A cable driven wrist mechanism for a robot arm which executes a rolling motion and a pitching motion. The wrist mechanism includes a first drive body and a second drive body which are independently driven. The wrist mechanism includes first and second rotary bodies which are connected to the first and second rotary bodies. The wrist mechanism further includes a third drive body perpendicular to the first and second drive bodies. At least two cables are connected between the drive bodies and the rotary bodies in a criss-cross manner to transmit forces of the first and second rotary bodies to the third rotary body.

4 Claims, 8 Drawing Sheets

CABLE-DRIVEN WRIST MECHANISM FOR ROBOT ARMS

CROSS-REFERENCE TO RELATED APPLICATIONS

This application is a Continuation-In-Part (CIP) application that claims benefit, under 35 USC §120, of U.S. patent application Ser. No. 10/768,279, filed 29 Jan. 2004, now abandoned and that claims foreign priority benefits under 35 USC §119(a) to Korean Patent Application No. 10-2003-0046140 filed 8 Jul. 2003, both of which are incorporated herein by reference.

FIELD OF THE INVENTION

The present invention relates to wrist mechanisms for robot arms, and more particularly, to a cable-driven wrist mechanism for robot arms which smoothly executes wrist motions by use of cables.

DESCRIPTION OF THE RELATED ART

A variety of techniques for wrist mechanisms of robot arms have been proposed. In particular, techniques to design general wrist shapes of robot arms and wrist mechanisms of robot arms for accomplishing specific objects have been proposed in Korean Utility Model Laid-Open Publication NOS. 1996-16644 and 1997-28012, and Korean Patent Laid-Open Publication NOS. 1998-0054687, 1998-0701448, and 1999-0070427.

Figure 1:
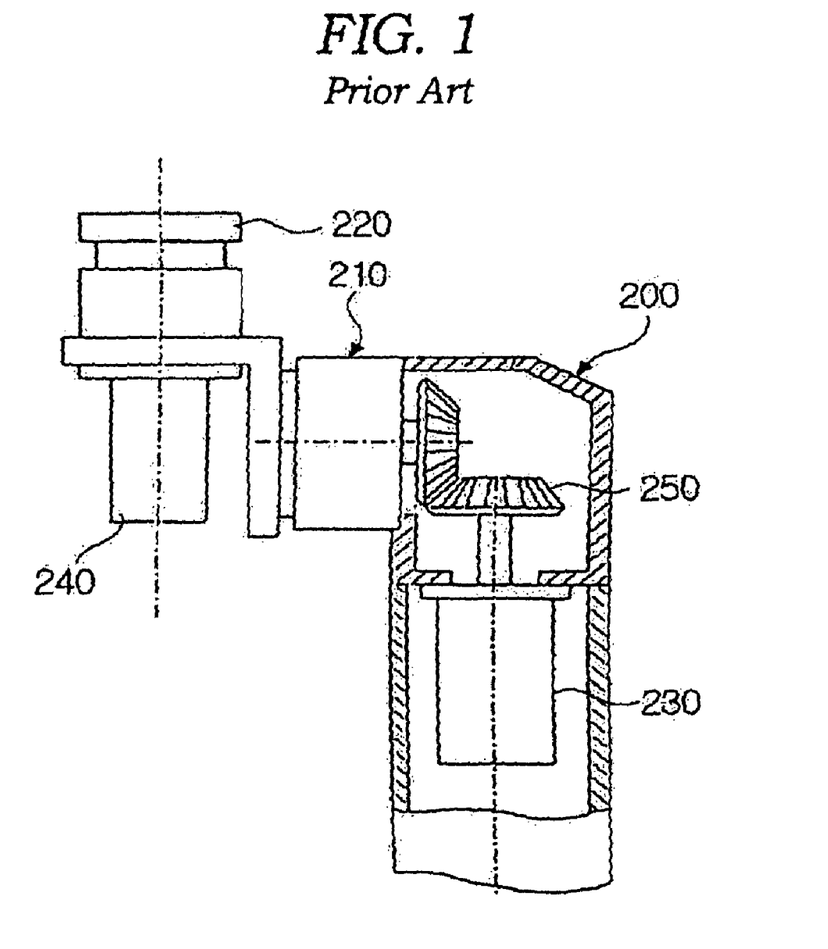
FIG. 1 is an exploded sectional view showing a construction of a conventional wrist mechanism for robot arms.

FIG. 1 is an exploded sectional view showing a wrist mechanism for robot arms, proposed in Korean Patent Laid-Open Publication NO. 1998-0701448. As shown in FIG. 1, a wrist unit 210 is coupled to an end of a robot arm 200. A tool holder 220 is provided at the wrist unit 210 to connect an additional tool, such as a welding device to the wrist unit 210.

A first motor 230 is installed in the robot arm 200, so as to transmit a rotating force of the first motor 230 to the wrist unit 210 via a bevel gear mechanism 250. The wrist unit 210 thus rotates about a first rotating axis perpendicular to a direction of a motion of the robot arm 200.

A second motor 240 is mounted to the wrist unit 210. The second motor 240 rotates the tool holder 220 which is provided at the wrist unit 210. The second motor 240 is mounted to the wrist unit 210 in such a manner that the tool holder 220 rotates about a second rotating axis perpendicular to the first rotating axis of the wrist unit 210. Accordingly, the wrist unit 210, on which a tool is connected to the tool holder 220, executes a pitching motion and a rolling motion according to operations of the first and second motors 230 and 240.

In general, in the conventional wrist mechanisms for robot arms, a gear mechanism has been used as a power transmitting unit to transmit a rotating force of a motor to a wrist of a robot arm to thereby accomplish a rotating motion of the wrist, such as the wrist unit 210 of FIG. 1. However, there are several disadvantageous in the conventional wrist mechanisms for robot arms using the gear mechanism as power transmitting means.

First, backlash as well as friction is caused in the power transmitting unit using the gear mechanism. The backlash is clearance which a gear can be moved without moving a mating gear when two gears engage with each other. The backlash provides power transmission losses between gears. To reduce the backlash, the contact areas between the gears engaging with each other should be increased. However, if the contact areas between the gears increase to reduce the backlash, the power transmission efficiency of gears reduces, because the friction between the gears increases. Accordingly, problems of the backlash and friction are not easily solved in a power transmitting unit using the gears.

Second, the power transmitting unit using gears is difficult to be adapted for use with small-sized machines. Generally, at least two drive motors should be provided in the wrist mechanism of the robot arm to secure a proper motion of the wrist. Moreover, the drive motors, which are installed in the wrist mechanism of the robot arm, must have respective rotating axes perpendicular to each other, so as to have different operational ranges. Such constraint in which two or more drive motors should be installed in the wrist mechanism of the robot arm makes it very difficult to apply drive motors to a small-sized wrist mechanism of the robot arm.

Even though two or more drive motors may be installed in the small-sized wrist mechanism of the robot arm, a plurality of bevel gears must be installed therein, so as to secure the rolling and pitching motions of the wrist of the robot arm. Therefore, the rolling and pitching motions of the wrist of the robot arm may not be accurately executed, due to the large backlash and the large friction which are caused in the power transmitting unit using a number of gears.

Recently, to solve such problem caused by backlash in the power transmitting unit using the gears, a cable-driven power transmitting unit has been proposed. As an example, a power transmitting unit using cables was disclosed in U.S. Pat. No. 5,046,375, entitled 'COMPACT CABLE TRANSMISSION WITH CABLE DIFFERENTIAL'. In particular, the power transmitting unit disclosed in the above-mentioned '375 patent executes two-degree of-freedom motion of rolling and pitching by use of the cables. However, the power transmitting unit proposed in the '375 patent is problematic in that the application thereof in a small-sized structure, such as the wrist mechanism of a robot arm is very difficult in the viewpoint of outward appearance or functional operations, because the width of the mechanism must be increased by a horizontal arrangement of two motors in the power transmitting unit.

SUMMARY OF THE INVENTION

Accordingly, the present invention has been made keeping in mind the above problems occurring in the prior art, and an object of the present invention is to provide a cable-driven wrist mechanism for robot arms which occupies a small space, and in which the pitching and rolling motions of the wrist for the robot arms are accurately and smoothly executed.

Additional aspects and/or advantages of the invention will be set forth in part in the description which follows and, in part, will be obvious from the description, or may be learned by practice of the invention.

The above and/or other aspects are achieved by providing a cable-driven wrist mechanism for a robot arm including first and second motors provided in the robot arm, a first drive body rotated by the first motor, a second drive body placed above the first drive body. The second drive body is rotated by the second motor about a same rotating axis as that of the first drive body and independently with respect to the first drive body. The wrist mechanism further includes a first rotary body rotated about a rotating axis which is perpendicular to the rotating axis of the first drive body and located in the same plane as the rotating axis of the first drive body, a second rotary body having a rotating axis same as the first rotary body. The second rotary body is symmetric to the first rotary body with respect to the rotating axis of the first drive body.

The wrist mechanism further includes a third rotary body connected to a sub-shaft which perpendicularly branches from the rotating axis of the first and second rotary bodies. The wrist mechanism further includes a power transmitting unit for transmitting rotating forces from the first and second drive bodies to the first and second rotary bodies, respectively. The power transmitting unit includes at least two cables which are connected between each of the first and second drive bodies and each of the first and second rotary bodies in a bi-directional manner to bridge between the drive body and the rotary body, with both ends of each of the two cables being fixed to the drive body and the rotary body, respectively. The wrist mechanism further includes a rotating force transmitting devices for transmitting the rotating forces of the first and second rotary bodies to the third rotary body.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Reference now should be made to the drawings, in which the same reference numerals are used throughout the different drawings to designate the same or similar components.

Figure 2:
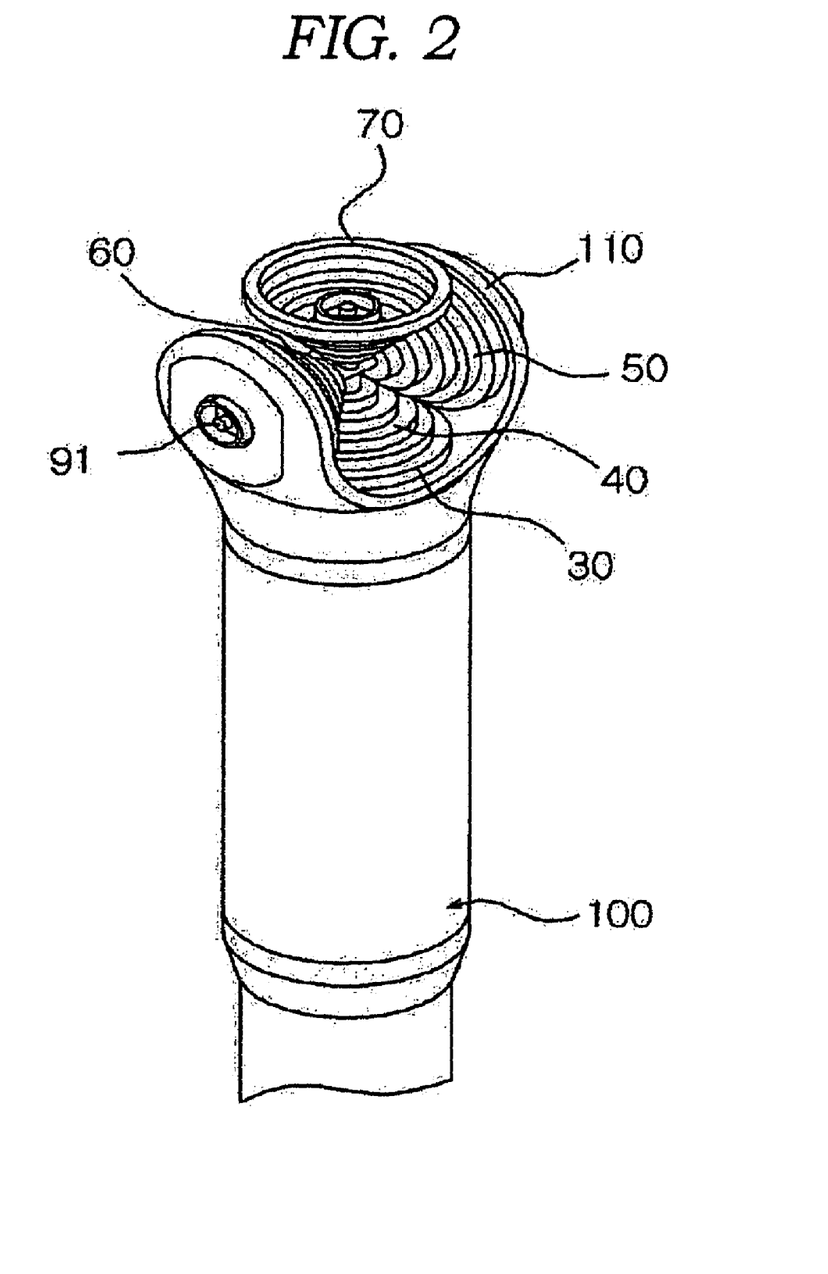
FIG. 2 is a perspective view showing a cable-driven wrist mechanism for robot arms, according to an embodiment of the present invention.

FIG. 2 is a perspective view showing a cable-driven wrist mechanism for robot arms, according to an embodiment of the present invention. A robot arm 100 has a pace at an end portion thereof such that a cable-driven wrist mechanism can be installed at the space. Support units 110 vertically installed at the space of the robot arm 100.

A first drive body 30 and a second drive body 40 are respectively placed on the end portion of the robot arm 100 to be layered on top of another. Each of the first and second drive bodies 30 and 40 has a rotating axis parallel to a longitudinal direction of the robot arm 100 and can rotate independently with respect to each other. The first and second drive bodies 30 and 40 preferably have the same rotating axis. A first rotary body 50 and a second rotary body 60 are provided on a second rotating shaft 91 between the two support units 110. The first and second rotary bodies 50 and 60 rotate around the second rotating shaft 91. The rotating axis of the first and second drive bodies 30 and 40 are perpendicular to the second rotating shaft 91 of the first and second rotary bodies 50 and 60.

In the meantime, the second rotating shaft 91 of the first and second rotary bodies 50 and 60 has a sub-shaft 92 (see, FIG. 3) which perpendicularly branches from a center of the second rotating shaft 91 in such a manner that the second rotating shaft 91 and the sub-shaft 92 define a T-shaped configuration. A third rotary body 70 is rotatably mounted to the sub-shaft 92 of the second rotating shaft 91.

Figure 3:
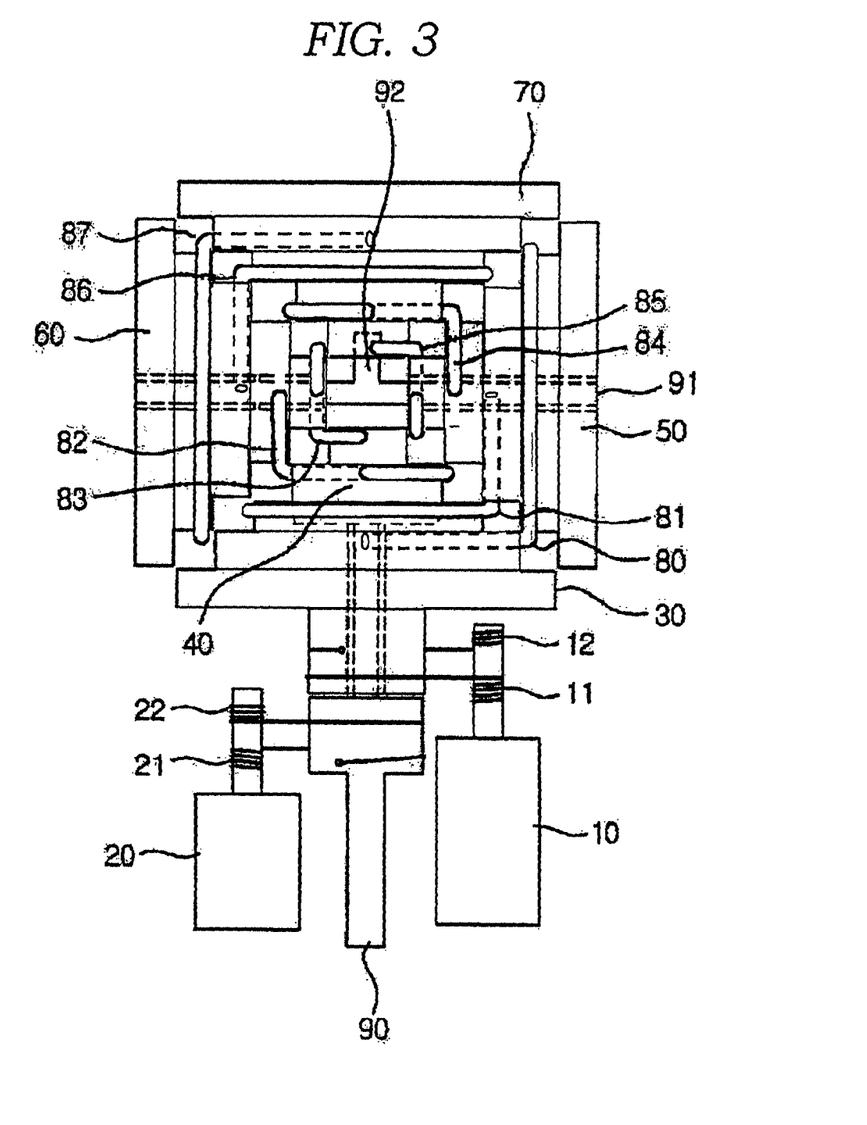
FIG. 3 is a view showing the construction of the cable-driven wrist mechanism of FIG. 2.

FIG. 3 is a view showing an operation of the cable-driven wrist mechanism of FIG. 2.

The robot arm 100 includes first and second motors 10 and 20 therein. The first and second motors 10 and 20 rotate the first and second drive bodies 30 and 40, respectively.

Each of the first and second drive bodies 30 and 40 comprises a concentrically stepped body with three drum parts having different diameters, respectively. The first drive body 30 is placed above the first and second motors 10 and 20. The second drive body 40 is placed above the first drive body 30. The first drive body 30 has a boss at the lower portion thereof and is hollowed along the rotating axis thereof to form a shaft hole. A first rotating shaft 90 passes through the shaft hole of the first drive body 30 and an end portion of the first rotating shaft 90 is connected to the second drive body 40. Therefore, that the first body 30 has the same rotating axis as the second drive body 40.

The first and second motors 10 and 20 rotate the first and second drive bodies 30 and 40 by use of cables, respectively. To transmit the rotating forces of the first and second motors 10 and 20 to the first and second drive bodies 30 and 40, respectively, two cables 11 and 12 or 21 and 22 are wound in opposite directions around the output shaft of the first and second motors 10 and 20 and bosses of the first drive body 30 and the first drive shaft 90, respectively. The second motor 20, which is provided under the first drive body 30, cannot directly transmit its rotating force to the second drive body 40, because the second drive body 40 is placed above the first drive body 30. Accordingly, the rotating force of the second motor 20 is transmitted to the second drive body 40 via the first rotating shaft 90. The first rotating shaft 90, around which the two cables 21 and 22 are wound in opposite directions, preferably has a same diameter as the boss of the first drive body 30 around which the two cables 11 and 12 are wound in opposite directions, since it is preferable for the first drive body 30 to have a same rotating ratio as the second drive body 40 in order to efficiently control the motions of the wrist of the robot arm.

When the first and second motors 10 and 20 respectively rotate in directions to wind the cables, the rotating forces of the first and second motors 10 and 20 are respectively transmitted to the first and second drive bodies 30 and 40 by the tensions of the cables. However, when the first and second motors 10 and 20 respectively rotate in directions to unwind the cables, the rotating forces of the first and second motors 10 and 20 are not transmitted to the first or second drive body 30 or 40, since no tensile force is exerted to the cables. Therefore, two cables are required for each of the first and second motors 10 and 20, so as to accurately transmit the rotating forces, which are generated by the reversible rotations of the first and second motors 10 and 20, to the first and second drive bodies 30 and 40, respectively.

The first and second rotary bodies 50 and 60 are provided at the right and left sides above the first and second drive bodies 30 and 40, respectively. Each of the first and second rotary bodies 50 and 60 rotate around the second rotating shaft 91. Each of the first and second rotary bodies 50 and 60 comprises a concentrically stepped body with five drum parts having different diameters, thus having four steps.

The second rotating shaft 91 of the first and second drive bodies 30 and 40 has the sub-shaft 92 which branches perpendicularly from the center of the second rotating shaft 91. The third rotary body 70 is rotatably connected to the subshaft 92 of the second rotating shaft 91. The third rotary body 70 comprises a concentrically stepped body with five drum parts having different diameters, in the same manner as the first and second rotary bodies 50 and 60. The third rotary body 70 is the body which executes the rolling and pitching motions of the wrist of the robot arm 100. Additional tools or other equipments are held on an upper end of the third rotary body 70.

Two cables 80 and 81 are respectively connected between the first drive body 30 and the first rotary body 50 in a bi-directional manner to bridge between the first drive body 30 and the first rotary body 50. Another two cables 82 and 83 are respectively connected between the second drive body 40 and the second rotary body 60 in a bi-directional manner to bridge between the second drive body 40 and the second rotary body 60. Thus, the rotating forces of the first and second drive bodies 30 and 40 are respectively transmitted to the first and second rotary bodies 50 and 60 via the cables 80 and 81, 82 and 83.

In the same manner, two cables 84 and 85, 86 and 87 are connected between each of the first and second rotary bodies 50 and 60 and the third rotary body 70, so that the rotating force of each of the first and second rotary bodies 50 and 60 is transmitted to the third rotary body 70 via the cables 84 and 85, 86 and 87. At this time, the cables are wound around the external surface of the drum parts of the first and second drive and rotary bodies 30, 40, 50 and 60 and does not interfere with each other, and to be securely fixed to the external surfaces of the drum parts of the first and second drive and rotary bodies 30, 40, 50 and 60.

Figure 4:
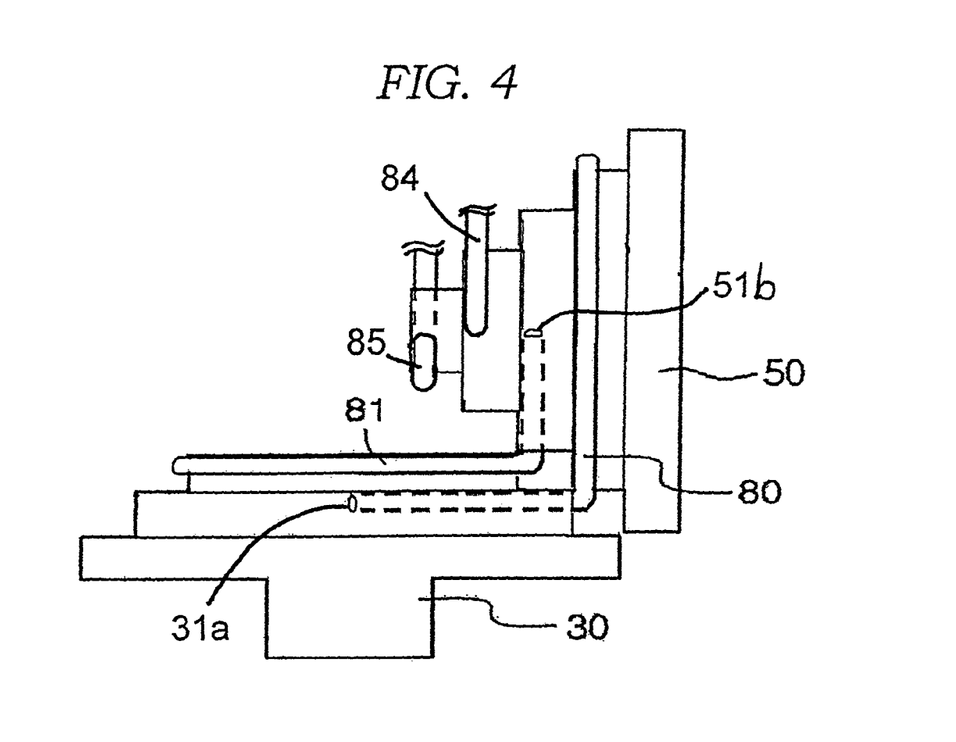
FIG. 4 is a partially enlarged view of the cable-driven wrist mechanism of FIG. 3.

In a detailed description, FIG. 4 is a partially enlarged view of the cable-driven wrist mechanism of FIG. 3. As shown in FIG. 4, the two cables 80 and 81 are respectively connected between the first drive body 30 and the first rotary body 50.

The first drive body 30 and the first rotary body 50 are respectively placed, such that the rotating axis of the first drive body 30 is perpendicular to the rotating axis of the first rotary body 50. Each of the first drive body 30 and the first rotary body 50 comprises a concentrically stepped body with a plurality of drum parts having different diameters. The edges of the drum parts of the first drive body 30 are contiguous to the edges of the drum parts of the first rotary body 50, but do not contact with each other. That is, the first drive body 30 is operatively connected by a clearance to the first rotary body 50. It is necessary that the clearance is no larger than the radius of the cable under any circumstances. Due to the above-mentioned configuration of the drum parts of the first drive and rotary bodies 30 and 50, the two cables 80 and 81 are not separated from the junction of the first drive body 30 and the first rotary body 50 and, simultaneously, friction does not occur between the first drive body 30 and the first rotary body 50. Fixing holes 31 and 51 are respectively provided on the first drive body 30 and the first rotary body 50, so that the ends of the cables 80 and 81 are respectively fixed to the fixing holes 31 and 51.

Figure 8A:
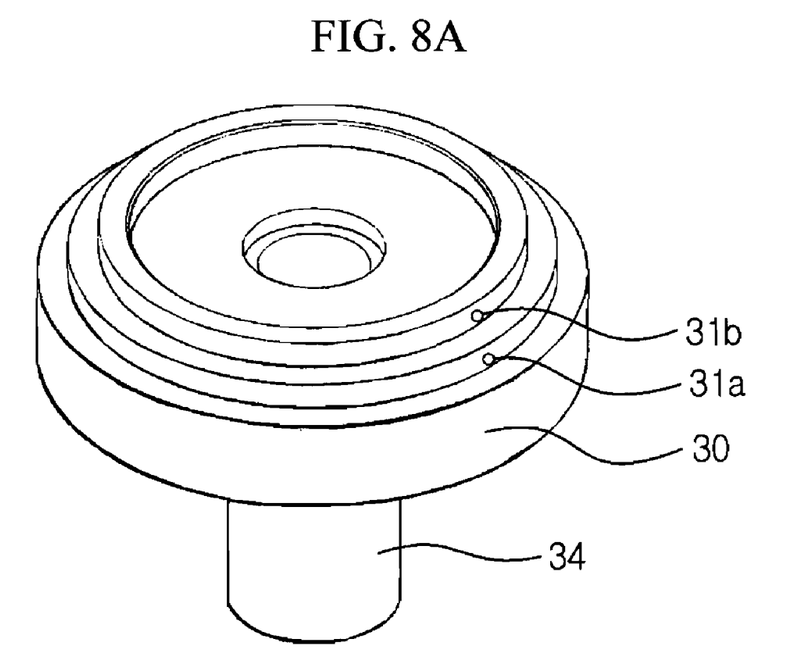
FIGS. 8A and 8B are views showing holes to which one end of the cable is fixed, which is formed on a circumference of the drum part of first drive body and first rotary body of the cable-driven wrist mechanism according to an embodiment of the present invention.
Figure 8B:
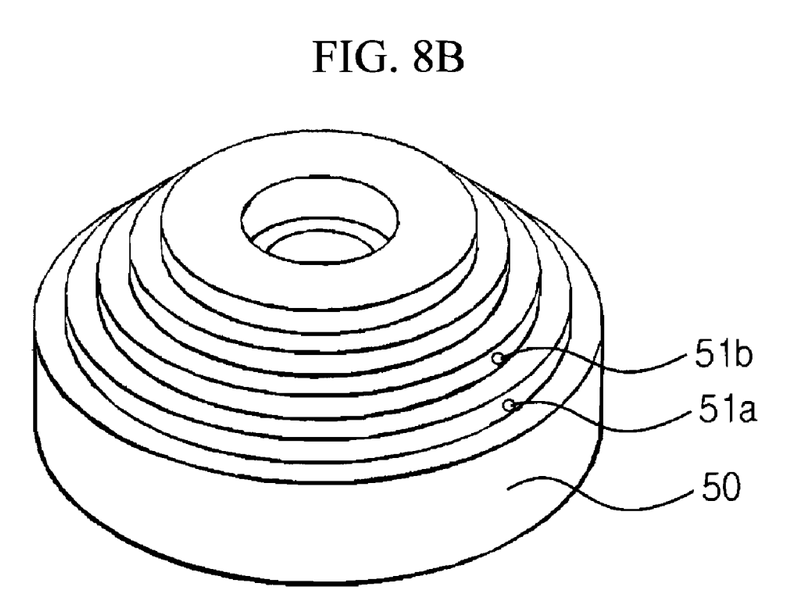

As shown in FIGS. 4, 8A, and 8B, the ends of the cable 80 are fixed to a hole "31a" formed on the circumference of the stepped body of the second drive body 30 and a hole "51a" formed on the circumference of the stepped body of the first rotary body 50. The ends of the cable 81 are also fixed to a hole "31b" formed on the circumference of the stepped body of the second drive body 30 and a hole "51b" formed on the circumference of the stepped body of the first rotary body 50 in the same way.

Each of the two cables 80 and 81 is wound around the first rotary body 50 after being wound around the first drive body 30. At this time, each of two the cables 80 and 81 is wound around the first rotary body 50 in a direction opposite to a direction along which each of the cables 80 and 81 is wound around the first drive body 30, so that each of the cables 80 and 81 wound around the first drive body 30 and the first rotary body 50 defines a 8-shaped profile. Each of the two cables 80 and 81 is wound in opposite directions around the first drive body 30 and the first rotary body 50 in the same reason as that described for the winding directions of the two cables 11 and 12, 21 and 22 which are wound around the output shaft of each of the first and second motors 10 and 20 and each of the boss of the first drive body 30 and the first rotating shaft 90.

Due to the above-mentioned winding manner of the cables 80 and 81, when the first drive body 30 rotates clockwise, the first rotary body 50 rotates clockwise by a tension of the cable 81 which is wound around an upper portion of the first drive body 30. On the other hand, when the first drive body 30 rotates counterclockwise, the first rotary body 50 rotates counterclockwise by a tension of the cable 80 which is wound around a lower portion of the first drive body 30.

Accordingly, the rotating force of the first drive body 30 is transmitted via the two cables 80 and 81 to the first rotary body 50 of which the rotating axis is perpendicular to the rotating axis of the first drive body 30. The transmission of the rotating forces between the second drive and rotary bodies 40 and 50, between the first and third rotary bodies 50 and 70, and between the second and third rotary bodies 50 and 70 is performed in the same principle as the above-mentioned transmission of the rotating force between the first and second drive and rotary bodies 30 and 50. In the meantime, each of the cables 80 and 81 is not separated from the junction of the first drive body 30 and the first rotary body 50, because the junction has a gap of which is smaller than a radius of each of the cables 80 and 81. (generally, the gap of the junction is formed to be fifty percentage or less than the radius of each of the cables 80 and 81.)

Figure 5:
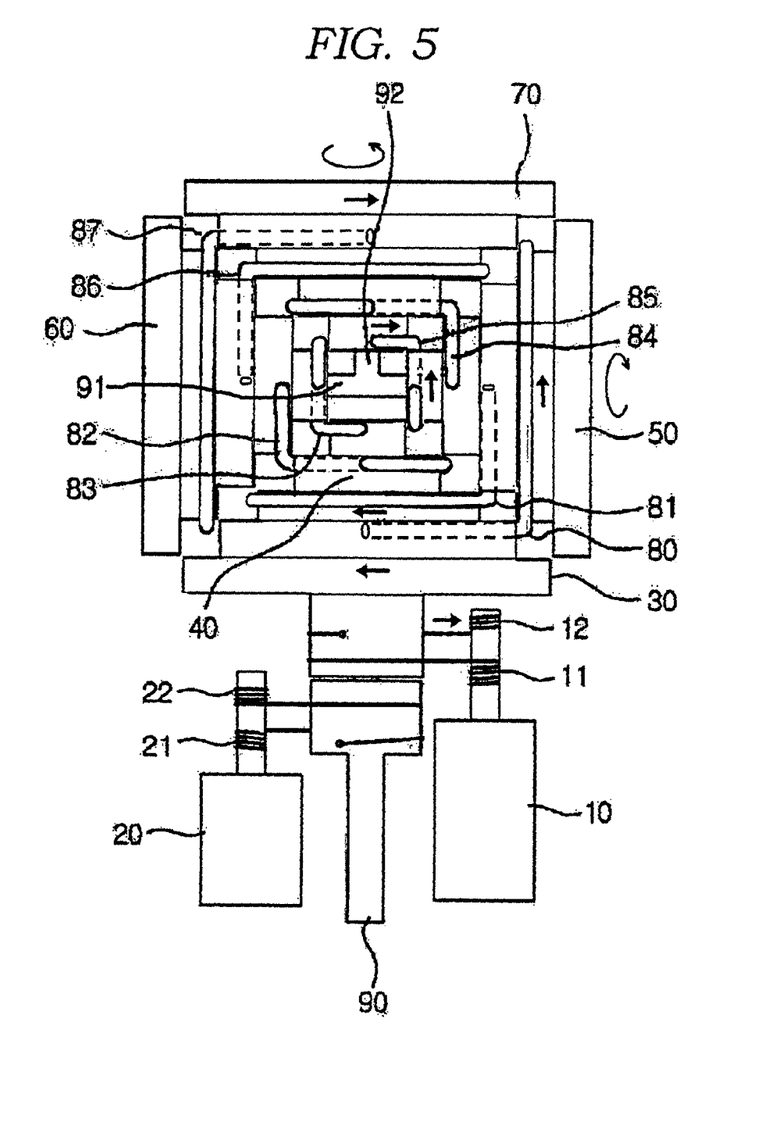
FIG. 5 is a view showing an operation of the cable-driven wrist mechanism of FIG. 3 when rolling and pitching motions are simultaneously executed.
Figure 6:
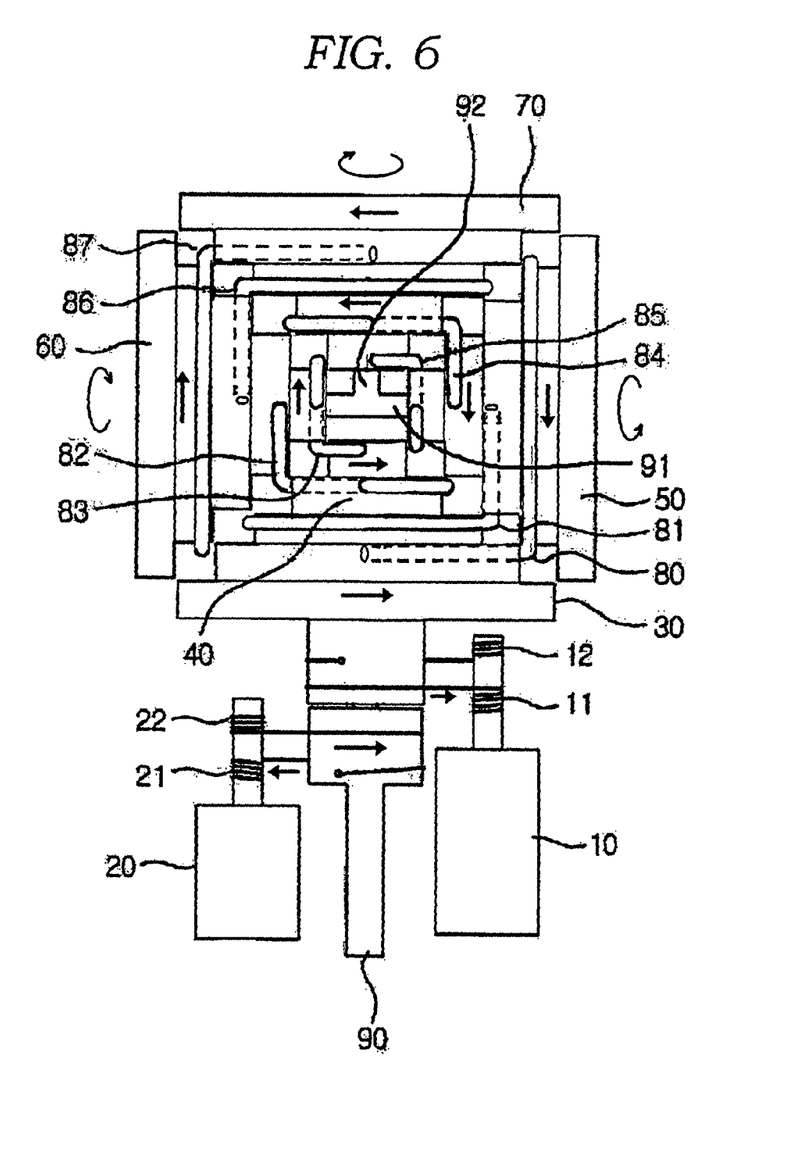
FIG. 6 is a view showing an operation of the cable-driven wrist mechanism of FIG. 3 when only the rolling motion is executed.
Figure 7:
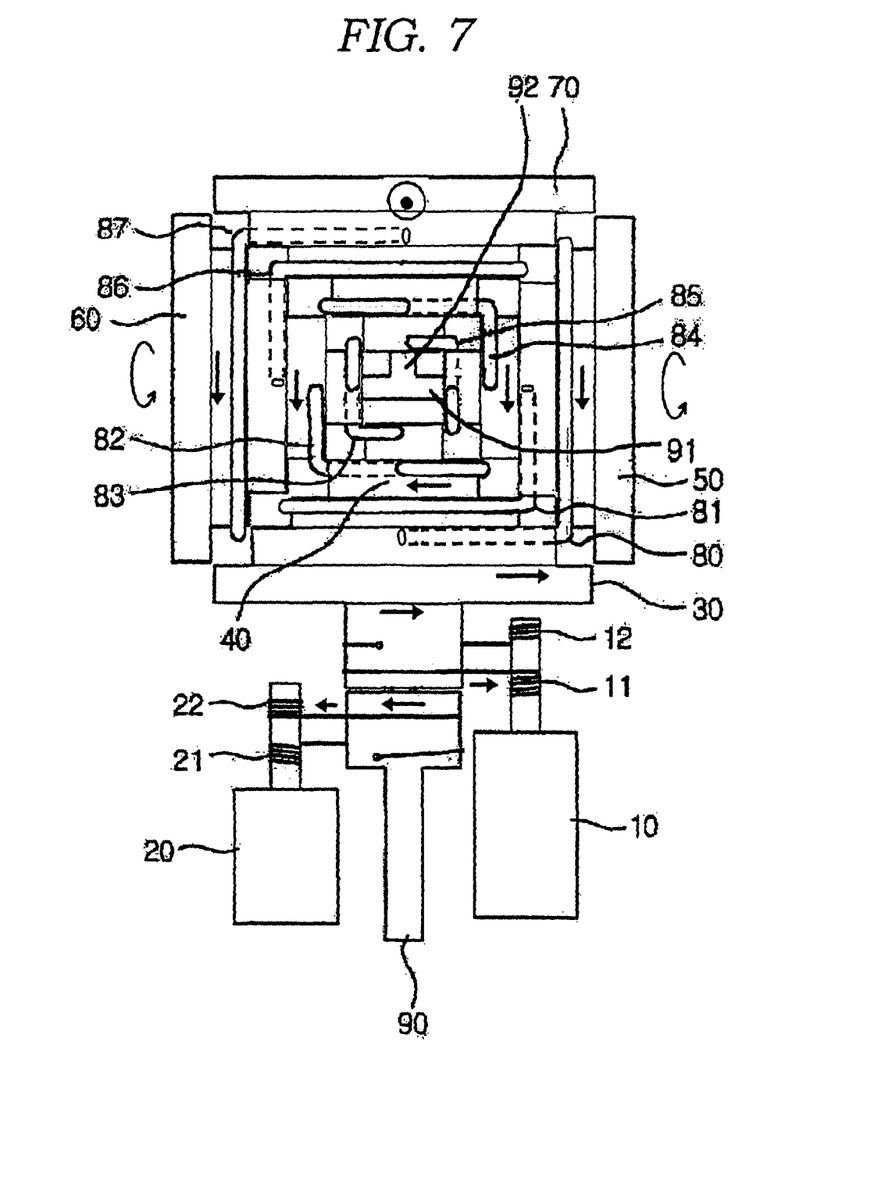
FIG. 7 is a view showing an operation of the cable-driven wrist mechanism of FIG. 3 when only the pitching motion is executed.

FIG. 5 is a view showing an operation of the cable-driven wrist mechanism of FIG. 3 when the rolling and pitching motions are simultaneously executed. FIG. 6 is a view showing an operation of the cable-driven wrist mechanism of FIG. 3 when only the rolling motion is executed. FIG. 7 is a view of an operation of the cable-driven wrist mechanism of FIG. 3 when only the pitching motion is executed.

In the cable-driven wrist mechanism of the present invention, the wrist of the robot arm 100 executes a variety of motions according to rotating directions and operational states of each of the first and second motors 10 and 20. As an example, in case that either of the first and second motors 10 and 20 is rotated, the rolling motion and the pitching motion of the wrist of the robot arm are simultaneously executed. As shown in FIG. 5, only the first motor 10 may be rotated. At this time, the second motor 20 is stopped, thus the second rotary body 60 is stopped. When the first motor 10 is rotated counterclockwise, the first drive body 30 is rotated by the tension of the cable 12 in the same direction as the rotation of the first motor 10. Continuously, the third rotary body 70 is rotated counterclockwise by a tension of the cable 85 which is connected between the first rotary body 50 and the third rotary body 70. At this time, because the second rotary body 60 is stopped, any rotating force is not transmitted from the second rotary body 60 to the third rotary body 70. Accordingly, the cable 86 is wound around the external surface of the third rotary body 70, and the cable 87 is unwound from the external surface of the third rotary body 70, so that the wrist of the robot arm 100 executes the rolling motion in that the third rotary body 70 is rotated counterclockwise, and simultaneously, executes the pitching motion in that the third rotary body 70 is swung clockwise around the second rotating shaft 91 at a predetermined angle, in response to the rolling motion of the third rotary body 70.

In the above-mentioned consecutive motions, the wrist of the robot arm simultaneously executes the pitching motion in which the third rotary body 70 is swung around the second rotating shaft 91, as well as the rolling motion. The above-mentioned motions of the third rotary body 70 are also executed by an operation of only the second motor 20. When the second motor 20 is rotated clockwise, both the rolling and pitch motions of the third rotary body 70 are executed counterclockwise, opposite from the directions of the rolling and pitch motions of the third rotary body 70 when the first motor 10 is rotated clockwise.

When the first and second motors 10 and 20 are simultaneously operated, the third rotary body 70 will execute the following motions.

In case that the first motor 10 and the second motor 20 are simultaneously rotated at the same angular speed and in the same rotating direction (See. FIG. 6).

As shown in FIG. 6, both the first and second motors 10 and 20 are rotated clockwise. Each of the first and second drive bodies 30 and 40 is thus rotated in the same direction (clockwise) as the rotation of each of the first and second motors 10 and 20 via each of the cables 11 and 21 which is wound around the output shaft of each of the first and second motors 10 and 20. At this time, only the cables 80 and 83 are tense by the rotations of the first and second drive bodies 30 and 40. Accordingly, both the first rotary body 50 and the second rotary body 60 are rotated counterclockwise.

Sequentially, the third rotary body 70 is rotated via the cables 84, 85, 86 and 87 by the rotations of the first and second rotary bodies 50 and 60. At this time, the first rotary body 50 is rotated counterclockwise, so that only the cable 84 is tense, and the second rotary body 60 is rotated clockwise, so that only the cable 86 is tense. Therefore, the third rotary body 70 is rotated clockwise.

After all, two pitching forces, in that the first and second rotary bodies 50 and 60 pitch the third rotary body 70, are counterbalanced by each other, and two rolling forces, in that the first and second rotary bodies 50 and 60 rotate the third rotary body 70, are superposed in the same direction. Therefore, the third rotary body 70 executes only the rolling motion when the first motor 10 and the second motor 20 are rotated at the same angular speed and in the same rotating direction.

In case that the first motor 10 and the second motor 20 are rotated at the same angular speed, but the rotating direction of the first motor 10 is opposite to the rotating direction of the second motor 20 (See. FIG. 7).

As shown in FIG. 7, the first motor 10 is rotated clockwise, and the second motor 20 is rotated counterclockwise. The first drive body 30 is thus rotated clockwise via the cable 11, and the second drive body 40 is thus rotated counterclockwise via the cable 22. In the above state, the first rotary body 50 rotates counterclockwise via the cable 80, and the second rotary body 60 rotates clockwise via the cable 82.

In the meantime, the rotating force, which is applied clockwise from the first rotary body 50 to the third rotary body 70 via the cable 84, and the rotating force, which is applied counterclockwise from the second rotary body 60 to the third rotary body 70 via the cable 87, are simultaneously transmitted to the third rotary body 70. Therefore, the two rotating forces, which are oppositely applied to the third rotary body 70, are counterbalanced by each other, so that the third rotary body 70 is stopped on the sub-shaft 92 of the second rotating shaft 91, without executing any rolling motion.

However, the cables 80 and 82 are respectively tense by the rotations of the first and second rotary bodies 50 and 60 in the same direction (counterclockwise). Therefore, the third rotary body 70 is swung counterclockwise around the second rotating shaft 91 by the tensions of the cables 80 and 82 which are caused by the rotations of the first and second rotary bodies 50 and 60. That is, the third rotary body 70 executes only the pitching motion, if the first motor 10 and the second motor 20 are rotated at the same angular speed and in the rotating directions opposite to the second motor 20.

In a brief description, when the first motor 10 and the second motor 20 are rotated at the same angular speed and in the same rotating direction, the wrist of the robot arm 100 executes only the rolling motion. When the first motor 10 and the second motor 20 are rotated at the same angular speed and in the opposite rotating directions, the wrist of the robot arm 100 executes only the pitching motion.

The above-mentioned motions of the wrist of the robot arm 100 are expressed by the following equations. The desired rolling and pitching motions of the wrist of the robot arm 100 can be designed by a linear combination of the following equations.

rolling angle($\theta_r$)=($\theta 1+\theta 2$)/2n pitching angle($\theta_p$)=($\theta 1-\theta 2$)/2n In the equations, the rotating angles of the first and second motors 10 and 20 are respectively represented as variable factors $\theta 1$ and $\theta 2$. The reduction ratio between the first and second motors 10 and 20 and the third rotary body 70 is represented as a variable factor n. In the meantime, each of the cables, which is connected between each of the first and second drive bodies and each of the first and second rotary bodies or between each of the first and second rotary bodies and the third rotary body, is preferably wound around predetermined portions of the bodies which have the same diameter, such that the drive bodies and the rotary bodies are rotated at the same rotating ratio.

In the embodiment of the present invention, each of the drive bodies and the rotary bodies comprises concentrically stepped body with three or five drum parts having different diameters. However, the number of the drum parts of the stepped bodies may reduce to simplify the manufacturing process of the drive and rotary bodies. That is, each of the drive bodies may comprise a concentrically stepped body with two drum parts having different diameters, and each of the rotary bodies may comprise a concentrically stepped body with four drum parts having different diameters. In addition, each of all the drive bodies and the rotary bodies may comprise a frusto-conical drum having a tapered surface.

As described above, the present invention provides a cable-driven wrist mechanism for robot arms which accurately and smoothly executes the rolling and pitching motions of the wrist of the robot arm while solving the problems of a backlash in addition to friction which has been experienced in conventional wrist mechanisms for robot arms. Furthermore, the cable-driven wrist mechanism of the present invention reduces the production costs thereof by use of cables, in place of expensive gears.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cable-driven wrist mechanism for a robot arm which executes a rolling motion and a pitching motion, the wrist mechanism comprising:

first and second motors provided in the robot arm;
a drive body comprising:
 a first drive body rotated by the first motor about a rotating axis and comprising at least two drum parts having different diameters to step the first drive body concentrically, and
 a second drive body rotated by the second motor about the rotating axis and independently with respect to the first drive body, the second drive body comprising at least two drum parts having different diameters to step the second drive body concentrically, wherein the second drive body is layered on to of the first drive body in such a manner that the first and second drive bodies are stepped together in order of diameter;
a first rotary body rotatably connected to a rotation shaft, wherein an axis of the rotation shaft is perpendicular to the rotating axis of the first drive body and located in the same plane as that of the rotating axis of the first drive body;
a second rotary body having a rotation shaft which being coincident with the rotation shaft of the first rotary body, the second rotary body being symmetric to the first rotary body with respect to the rotating axis of the first drive body;
a third rotary body rotatably connected to a sub-shaft which perpendicularly branches from the rotation shaft of the first rotary body, the third rotary body being operatively connected to the first and second rotary bodies with a clearance;
a power transmitting unit for transmitting rotating forces from the first and second drive bodies to the first and second rotary bodies, respectively, the power transmitting unit including at least a first set of cables and a second set of cables, each of the first and second sets of cables each comprising two cables;
rotating force transmitting devices for transmitting rotating forces of the first and second rotary bodies to the third rotary body;
wherein each of the first, second, and third rotary bodies includes at least four drum parts having different diameters to step each of the rotary bodies concentrically;
wherein the first drive body is operatively connected by the first set of cables to the first rotary body with the clearance, and the second drive body is operatively connected by the second set of cables to the second rotary body with the clearance, wherein the clearance is no larger than the radius of any one of the cables;
wherein a first end of each of the two cables in the first set is fixed to a circumferential portion of the each drum part of the first drive body and a second end of each of the two cables in the first set is fixed to a circumferential portion of the each drum part of the first rotary body such that each cable bridges the first drive body and the first rotary body in a bi-directional manner; and
wherein a first end of each of the two cables in the second set is fixed to a circumferential portion of the each drum part of the second drive body and a second end of each of the two cables in the second set is fixed to a circumferential portion of the each drum part of the second rotary body such that each cable bridges the second drive body and the second rotary body in a bi-directional manner.

2. The cable-driven wrist mechanism according to claim 1, wherein the first and second motors rotate the first and second drive bodies by use of cables, respectively.

3. The cable-driven wrist mechanism according to claim 2, wherein the rotating force transmitting devices includes a third set of cables comprising two cables which are connected between each of the first and second rotary bodies, and the third rotary body in a bi-directional manner to bridge between each of the first and second rotary bodies and the third rotary body.

4. The cable-driven wrist mechanism according to claim 1, wherein the rotating force transmitting devices includes a third set of cables comprising two cables which are connected between each of the first and second rotary bodies and the third rotary body in a bi-directional manner to bridge between each of the first and second rotary bodies and the third rotary body.

* * * * *

UNITED STATES PATENT AND TRADEMARK OFFICE
CERTIFICATE OF CORRECTION

PATENT NO. : 7,762,156 B2
APPLICATION NO. : 11/728040
DATED : July 27, 2010
INVENTOR(S) : Pyung Hun Chang, Seong Tae Kim and Hyung Soon Park It is certified that error appears in the above-identified patent and that said Letters Patent is hereby corrected as shown below:

- In Claim 1, Column 9, Line 22 of the patent, "second drive body is layered on to of the first drive" should read --second drive body is layered on top of the first drive--.

- In Claim 3, Column 10, Line 30 of the patent, "The cable-driven wrist mechanism according to claim 2," should read --The cable-driven wrist mechanism according to claim 1,--.

- In Claim 4, Column 10, Line 37 of the patent, "The cable-driven wrist mechanism according to claim 1," should read --The cable-driven wrist mechanism according to claim 2,--.

Signed and Sealed this
Twenty-sixth Day of July, 2011

David J. Kappos
*Director of the United States Patent and Trademark Office*